United States Patent
Bar-on et al.

(10) Patent No.: US 11,817,096 B2
(45) Date of Patent: Nov. 14, 2023

(54) ISSUE TRACKING SYSTEM HAVING A VOICE INTERFACE SYSTEM FOR FACILITATING A LIVE MEETING DIRECTING STATUS UPDATES AND MODIFYING ISSUE RECORDS

(71) Applicants: Atlassian Pty Ltd., Sydney (AU); Atlassian Inc., San Francisco, CA (US)

(72) Inventors: Noam Bar-on, San Francisco, CA (US); Bharath Booshan Lakshmi Narayanan, San Francisco, CA (US)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

(21) Appl. No.: 17/668,532

(22) Filed: Feb. 10, 2022

(65) Prior Publication Data

US 2022/0270603 A1 Aug. 25, 2022

Related U.S. Application Data

(63) Continuation of application No. 16/534,901, filed on Aug. 7, 2019, now Pat. No. 11,270,697.

(60) Provisional application No. 62/867,339, filed on Jun. 27, 2019.

(51) Int. Cl.
| | |
|---|---|
| *H04N 7/15* | (2006.01) |
| *G10L 15/22* | (2006.01) |
| *G06F 3/16* | (2006.01) |
| *G10L 15/04* | (2013.01) |
| *G10L 13/00* | (2006.01) |
| *G06F 16/00* | (2019.01) |

(52) U.S. Cl.
CPC .............. *G10L 15/22* (2013.01); *G06F 3/167* (2013.01); *G10L 13/00* (2013.01); *G10L 15/04* (2013.01); *G06F 16/00* (2019.01); *G10L 2015/223* (2013.01); *G10L 2015/225* (2013.01); *H04N 7/15* (2013.01)

(58) Field of Classification Search
CPC .................................. H04N 7/15; G06F 16/00
See application file for complete search history.

(56) References Cited

U.S. PATENT DOCUMENTS

| | | | |
|---|---|---|---|
| 2005/0152523 A1 | 7/2005 | Fellenstein et al. | |
| 2009/0307189 A1* | 12/2009 | Bobbitt | G06F 16/00 |
| 2013/0311177 A1* | 11/2013 | Bastide | H04N 7/15 |
| | | | 704/235 |
| 2014/0059582 A1 | 2/2014 | Knowles et al. | |

* cited by examiner

*Primary Examiner* — Feng-Tzer Tzeng

(74) *Attorney, Agent, or Firm* — Brownstein Hyatt Farber Schreck, LLP

(57) ABSTRACT

An issue tracking system configured to track issues, tickets, or tasks is described herein. The issue tracking system may include a voice interface system that may be used to create, modify, and delete issue records during a live meeting or event. The voice interface system may be configured to facilitate a live meeting conducted in a particular format or structure. The voice interface system may be adapted to determine a relevance score between a voice input and one or more respective issue records being tracked by the issue tracking system. If the relevancy score satisfies a threshold, a respective issue record may be selected for modification or editing during the live meeting through a series of responsive voice commands or other voice input.

20 Claims, 7 Drawing Sheets

ISSUE TRACKING SYSTEM HAVING A VOICE INTERFACE SYSTEM FOR FACILITATING A LIVE MEETING DIRECTING STATUS UPDATES AND MODIFYING ISSUE RECORDS

CROSS-REFERENCE TO RELATED APPLICATION(S)

This application is a continuation patent application of U.S. patent application Ser. No. 16/534,901, filed Aug. 7, 2019 and titled "Issue Tracking System having a Voice Interface System for Facilitating a Live Meeting Directing Status Updates and Modifying Issue Records," which is a nonprovisional patent application of and claims the benefit of U.S. Provisional Patent Application No. 62/867,339, filed Jun. 27, 2019 and titled "Issue Tracking System Having a Voice Interface System for Facilitating a Live Meeting Directing Status Updates and Modifying Issue Records," the disclosures of which are hereby incorporated herein by reference in their entireties.

TECHNICAL FIELD

Embodiments described herein relate to an issue tracking system and, in particular, to systems and methods for editing issue records of an issue tracking system using voice-activated prompts.

BACKGROUND

Managing large projects or engineering teams requires tracking multiple tasks to be performed by the various team members. Traditionally, status updates are obtained individually or in a regular status meeting in which a meeting organizer or secretary takes notes to record the various updates and team progress. However, this may require a dedicated meeting facilitator and the quality of the meetings may vary depending on the person facilitating the meeting. The systems and techniques described herein provide an automated system for implementing changes in the issue tracking system using synthesized speech prompts for a live update meeting.

SUMMARY

Embodiments described herein are directed to an issue tracking system that is configured to track issues, tickets, or tasks. The issue tracking system may be used to create, modify, and delete issue records during a live meeting or event. As described herein, the issue records may be updated during a live meeting using a voice interface system. The systems and techniques described herein use a voice interface system that is configured to interpret voice input from the participants in the meeting and identify a respective issue (from a set of displayed issues). The voice interface system may also receive and analyze further voice input that relates to activities conducted or to be conducted with respect to the identified issue. An issue record associated with the issue may be modified or edited in accordance with content extracted from the analyzed voice input, which may be stored by the issue tracking system and/or displayed during the meeting. The voice interface system may, in some cases, repeat this process for each issue to be discussed during the meeting based on voice commands received from the respective meeting participants.

Some example embodiments are directed to an issue tracking system having a voice interface for updating issue records tracked by the issue tracking system during a live meeting having multiple participants. The issue tracking system includes a terminal device having a display that is configured to display a graphical user interface that includes a set of graphical objects representing a set of issue records being tracked by the issue tracking system. The issue tracking system also includes a voice interface system for facilitating the live meeting with the multiple participants, the voice interface system comprising a processing unit that is configured to perform a series of operations. The processing unit may be configured to identify a project associated with the set of issue records and provide an audible prompt to a first participant of the multiple participants using an audio output device of the voice interface system. The processing unit may also be configured to detect a voice input from the first participant using an audio input device of the voice interface system and to analyze the voice input to produce a dataset including a set of keywords. A relevance percentage for the dataset may be determined with respect to at least a first issue record of the set of issue records. In response to the relevance percentage for the first issue record exceeding a threshold, a modification of the first issue record may be requested. In response to the modification of the first issue record, the processing unit may cause a display of a modified graphical object that represents the modification of the first issue record.

In some example embodiments, the relevance percentage is a first relevance percentage. The voice interface system may be further configured to determine a second relevance percentage with respect to a second issue record of the set of issue records. In response to both the second relevance percentage and the first relevance percentage exceeding the threshold, prompt a participant to select between the first issue record and the second issue record. In some cases, the participant is prompted to select between the first issue record and the second issue record through the graphical user interface. The voice interface system may be configured to modify either or both of the first relevance percentage or the second relevance percentage in accordance with a selection of either the first or second issue records.

In some embodiments, the relevance percentage is a first relevance percentage, the threshold is a first threshold, and the voice interface system is configured to determine a respective relevance percentage for each of the issue records of the set of issue records. In response to none of the respective relevance percentages exceeding the first threshold, the system may be configured to compute an epic relevance percentage for the dataset with respect to an epic issue record that relates to an overall goal for the project associated with the set of issue records. In response to the epic relevance percentage exceeding an epic threshold, the system may be configured to create a new issue record.

In some embodiments, the voice interface system is further configured to: provide at least one audible prompt for each issue record of the set of issue records during the live meeting; cause multiple issue records of the issue records to be modified in accordance with a respective voice input received in response to the at least one audible prompt; generate a summary log of modifications to the multiple issue records; and transmit the summary log of modifications to a group of users after the live meeting has ended.

Some example embodiments are directed to a system having a voice interface to facilitate updating issue records tracked by an issue tracking system during a live meeting having multiple participants. The system may include a display configured to display a graphical user interface having a set of graphical items that corresponds to a set of issue records being tracked by the issue tracking system. The system may also include an audio input device configured to receive voice input from the multiple participants, and an audio output device configured to produce audio output. The system may also include a voice interface system having a processing unit operably coupled to the display, the audio input device, and the audio output device, the processing unit of the voice interface system configured to: detect a first voice input from a first participant of the multiple participants using the audio input device; analyze the first voice input to produce a first extracted content; identify a current issue record of the set of issue records based on the first extracted content; detect a second voice input from the first participant; analyze the second voice input to produce a second extracted content; modify the current issue record based on the second extracted content to produce a modified issue record; cause the modified issue record to be stored in the issue tracking system; and display content associated with the modified issue record on the display.

In some embodiments, the voice interface system is configured to compute a relevance percentage for the first extracted content with respect to the current issue record. The current issue record may be identified based on the relevance percentage exceeding a threshold. In some cases, the voice interface system is configured to identify the first participant as being a user associated with one or more issue records of the set of issue records based on the first voice input. In some cases, the voice interface system is configured to: generate a first audio prompt in response to identifying the current issue record, the first audio prompt including a first query regarding past activity occurring with respect to the current issue record; generate a second audio prompt in response to receiving a first responsive voice input responding to the first audio prompt, the second audio prompt including a second query regarding current activity occurring with respect to the current issue record; generate a third audio prompt in response to receiving a second responsive voice input responding to the second audio prompt, the third audio prompt including a third query regarding future planned activity occurring with respect to the current issue record; receive a third responsive voice input responding to the third audio prompt; and modify the current issue record in accordance with one or more of: the first, second, or third responsive voice inputs. The first, second, and third audio prompts may include content that was extracted from the current issue record. In some instances, a status of the current issue record is changed from pending to complete based, at least in part, on the first voice input.

Some example embodiment are directed to a computer system for conducting a live meeting using a voice interface to update issue records of an issue tracking system during the live meeting. The computer system includes a display configured to display a set of graphical items that each corresponds to a respective issue record that is being tracked by the issue tracking system. The computer system may also include a terminal device having a processor that is operably coupled to an audio input device. The terminal device may be configured to: receive a first voice input using the audio input device; select a first issue record in accordance with content extracted from the first voice input; cause a first graphical item to be displayed on the display, the first graphical item corresponding to the first issue record; produce an audible prompt regarding the first issue record; receive a second voice input using the audio input device; extract a dataset including keywords from the second voice input; analyze the second voice input to determine a first action; cause the first issue record to be updated in accordance with the first action and the keywords of the dataset; and modify the first graphical item in accordance with the update to the first issue record.

In some embodiments, the first issue record is selected in accordance with extracted content, the selection may include: determining a relevance percentage for the content extracted from the first voice input with respect to the first issue record; and selecting the first issue record in response to the respective relevance percentage exceeding a threshold. In some embodiments, selecting the first issue record in accordance with extracted content comprises: determining a respective relevance percentage for the content extracted from the first voice input with respect to each of multiple issue records; and selecting the first issue record in response to the relevance percentage being largest for the first issue record as compared to other issue records of the multiple issue records.

In some embodiments, the first issue record is one of a set of issue records associated with a project/Selecting the first issue record in accordance with extracted content may include: determining a relevance for each of the issue records of the set of issue records; in response to none of the determined relevancies exceeding a threshold, identifying an epic issue record; creating a new issue record using content from the epic issue record; and selecting the new issue record as the first issue record.

In some embodiments, the audible prompt regarding the first issue record includes a query regarding one or more of: a past activity that has occurred in the past with respect to the first issue record; a planned activity that is planned to occur in the future with respect to the first issue record; or a problem or issue with respect to the first issue record.

Some example embodiments are directed to a system having a voice-activated interface for an issue tracking system that tracks issue records in a database. The voice-activated interface may be configured to facilitate a live update meeting. The system may include a display displaying a graphical user interface depicting multiple graphical objects, each graphical object corresponding to an issue record of a set of issue records being tracked by the issue tracking system. The system may also include a terminal device having an audio input device, an audio output device, and a processor configured to: receive a voice input from a participant of a group of participants attending the live update meeting, the voice input received using the audio input device; analyze the voice input to classify a user activity with respect to a respective issue record of the set of issue records; in response to the user activity being classified as related to past activity, modify a status of the respective issue record in accordance with the voice input; in response to the user activity being classified as related to planned activity, modify the respective issue record to include content that corresponds to an activity extracted from the voice input; in response to the user activity being classified as related to a problem or issue, modify the respective issue record to include content that corresponds to the problem or issue content extracted from the voice input; and cause a display of a respective graphical object in the graphical user interface, the respective graphical object corresponding to the modified respective issue record.

In some embodiments, the terminal device is configured to select the respective issue record based on content extracted from the voice input. In some cases, the terminal device is configured to produce a series of audible prompts, each audible prompt corresponding to a respective issue record of the set of issue records. The terminal device may be configured to receive a series of voice inputs, each voice input received in response to a respective audible prompt. The terminal device may be configured to update respective issue records in accordance with a respective voice input of the series of voice inputs.

In some cases, the terminal device is configured to generate a meeting summary that includes a list of updates performed during the live update meeting. The meeting summary may be transmitted to one or more of the group of participants of the live update meeting.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
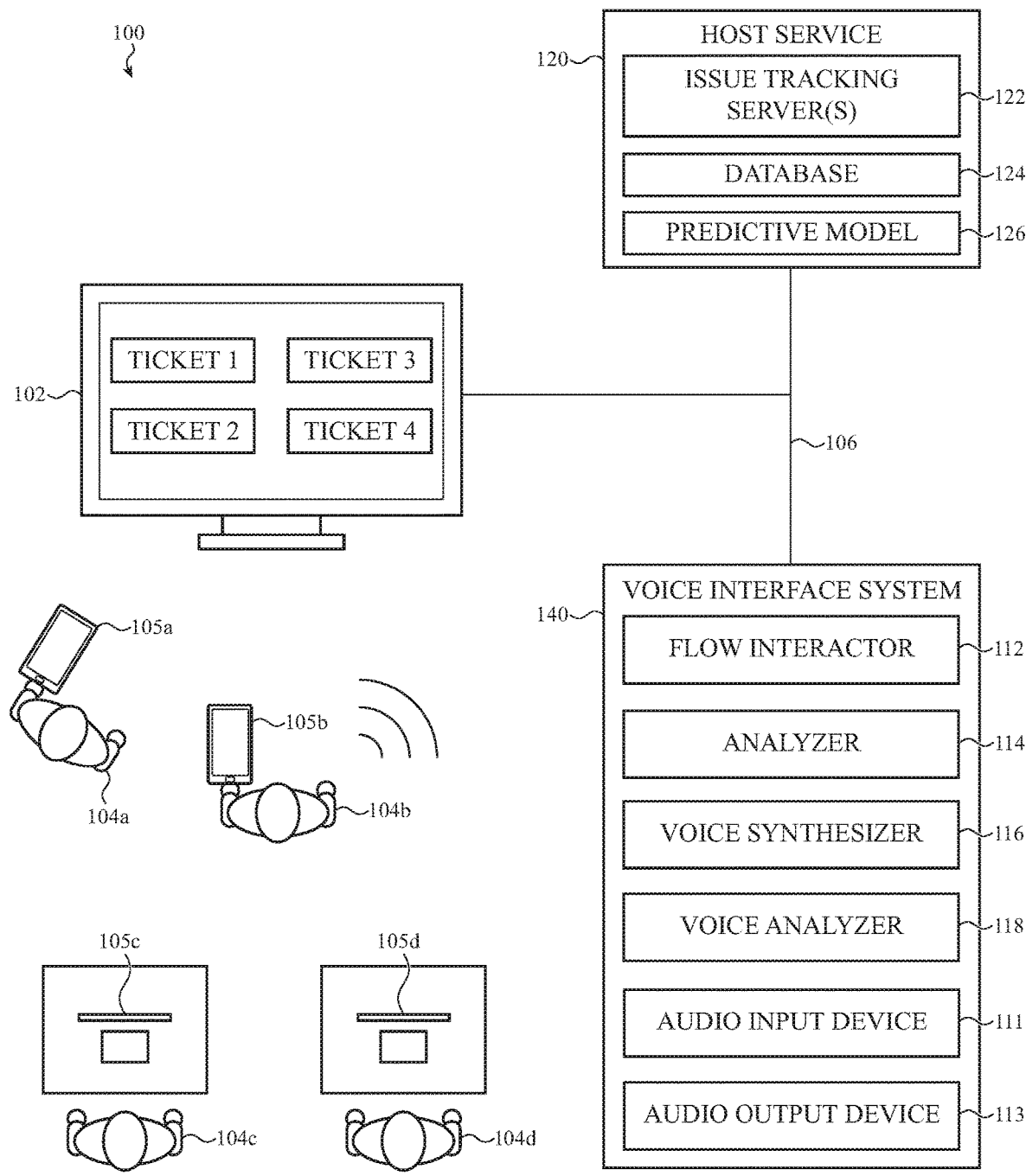
FIG. 1 is a schematic representation of an issue tracking system having a voice interface system.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein are directed to systems and methods for an issue tracking system that is adapted to monitor and track various issues or tickets that are associated with a project, story, or epic. As described herein, the issue tracking system may include a voice interface system that is configured to facilitate a meeting that may be conducted in a particular format. The voice interface system may include a specially configured terminal device that includes an audio input device that is configured to receive voice input and an audio output device and voice synthesizer that is configured to output voice prompts or other synthesized speech audio. The voice interface system may also be operably coupled to an issue tracking server and be configured to identify one or more respective issues based on a voice input from a meeting participant. As described herein, the voice interface system may be adapted to determine a relevance percentage for a given voice input and, based on the relevance percentage, identify one or more potential relevant issue records to be modified. In some cases, the voice interface system may also be adapted to create a new issue if the voice input corresponds to a story or epic description and also does not have an adequate relevance percentage match with an existing issue record.

The embodiments described herein may be used to conduct or facilitate a live meeting with multiple participants that are attending either physically or virtually through a telephone, video, or other form of remote conference. The systems and techniques described herein are directed to a voice interface system that may be more than a system that receives voice commands. The voice interface system may be configured to facilitate or direct a meeting of human participants and is configured to interact with meeting participants as a member of the meeting and/or as a meeting leader. The voice interface system may be adapted to identify relevant discussion points, extract key data from a live discussion, and provide relevant updates to the issue records in accordance with the live discussion. The voice interface system may also be adapted to identify participants, match participants with one or more relevant issue records, and prompt the participants for additional information regarding the relevant issue records.

In some embodiments, the voice interface system may be adapted to conduct a regular stand-up meeting with a group of participants in order to track progress on a project or set of tasks. In general, a stand-up meeting may have an expected meeting flow or discrete set of issues that are being addressed by a set of users, which may be represented by the participants of a live meeting. During the live meeting, the voice interface system may prompt each participant one-by-one in accordance with the set of issues or tickets on the board or agenda. Each participant may provide a status update including tasks completed during the last period, tasks planned for the upcoming period, issues or roadblocks, additional resources needed, and other information that may be relevant to the issue or ticket being tracked. In accordance with some embodiments, the voice interface system may be configured to analyze the voice input and extract a set of key words while ignoring or discarding input that may have low relevance to the issue or ticket being tracked. The voice interface system may be adapted to implement one or more structured commands or actions based on the extracted key words in order to modify or edit the issue or ticket being tracked. This process may be repeated for multiple participants during the live meeting in order to advance or update the status for the respective set of issues or tickets being discussed.

In accordance with some embodiments described herein, the voice interface system may use a predictive model that has been constructed using a machine learning or other analytical modeling tool that has been trained using previous meeting interactions and/or a given training set of data. In particular, the model may be adapted to draw a correlation between a set of key words and one or more issue records stored in the system. The model may be initially trained using a set of example keywords and template records or example issue records. However, over time, through confirmations provided through the voice interface system, the model may be enhanced and the reliability of the recommendations improved.

In accordance with some embodiments described herein, the voice interface system may be adapted to provide a graphical prompt providing the participant one or more options to select from. The graphical prompts may be used to resolve potential conflicts or multiple matches identified by the system. The graphical prompts may also be used to confirm selections or recommendations made by the system, which may be used as feedback for the machine learning model or tool.

In accordance with some embodiments, the voice interface system may also be adapted to generate a log or summary of meeting activity. The meeting log or meeting summary may include a summary of edits or changes made to each of the respective issue records during the course of the live meeting. The log may be organized by issue or, in some embodiments, may be organized by user. The log may also be filtered to remove minor changes or updates and include only changes in issue status and the creation of new issue records.

An issue tracking system, as described herein, may be used to refer to a project management tool that may be specially configured for tracking issues and tasks that are associated with a software development project. As described herein, an issue tracking system may be used to refer to a project management tool that can be implemented in whole or in part as software executed by a virtual or physical server or other computing appliance that provides a team of individuals with a means for documenting, tracking, and monitoring completion of work as discrete tasks related to completion, development, or maintenance of a defined project or goal. In many examples, an issue tracking system is configured for use by a software development team to track completion and assignment of discrete tasks related to software development projects from creation of new user stories or epics (i.e., user-perspective feature requests or desired functionality), through proof of concept testing, through integration testing, through release of software to one or more users, and through reporting and fixing of software errors ("bugs"). In other cases, an issue tracking system can be configured for non-software tracking purposes, such as for use by a human resources team, an information technology support group, and so on.

An issue tracking system, as described herein, may increase the efficiency of a team of individuals working on a common goal or project by facilitating the organization of the assignment of discrete items of work to the individual or team of individuals most suited to perform that work. More particularly, each item of work tracked by an issue tracking system is referred to as an "issue" that is typically assigned to a single individual to complete. Example "issues" can relate to, without limitation: a task to identify the cause of a software bug; a task to perform a feasibility assessment for implementation of a new feature; a task to fix an identified software bug; and so on.

For purposes of the following disclosure, the terms "issue report," "issue," and "ticket" may be used to generally refer to an issue or item that is being tracked by the system. More specifically, the term "issue request" is generally used to describe input provided by a user to an issue tracking system that may result in a creation of an "issue record." As used herein, the term "issue record" may be used to refer to a discrete database record associated with an issue or item being tracked by an issue tracking system. As used herein, an issue record may correspond to a discrete task or set of tasks to be accomplished by the one or more assignees. The issue record may include a description of the tasks to be completed, a status, a time estimate, complexity, and other descriptive attributes. An issue record may also correspond to a story or an epic, which may relate to a long-term goal or set of product features to be developed. Although not required, an issue record can be stored, at least temporarily, in a database accessible to an issue tracking system. While these terms are used herein with respect to specific examples and potential implementations, it may be appreciated that these are merely examples and other embodiments can be configured to receive, anticipate, predict and/or recommend additional or alternative data, user inputs, or issue requests or issue records associated with an issue tracking system.

These foregoing and other embodiments are discussed below with reference to FIGS. 1-7. However, those skilled in the art will readily appreciate that the detailed description given herein with respect to these figures is for explanatory purposes only and should not be construed as limiting.

FIG. 1 depicts a schematic diagram of an example implementation of an issue tracking system 100 also referred to herein as simply system 100. In particular, FIG. 1 depicts an issue tracking system 100 including a voice interface system 110 that is operably coupled to a host service 120 by a network 106. The voice interface system 110 may facilitate a live meeting attended by the meeting participants 104a-d and conducted in accordance with a predefined or semi-structured format. In general, the voice interface system 110 is adapted to provide more than a response to voice commands during a live meeting. The voice interface system 110 may be adapted to participate in the live meeting as a member or participant and, in some cases, the voice interface system 110 is adapted to lead or direct the live meeting and may identify relevant discussion points and/or extract key data from live discussion among the participants 104a-d. In some implementations, the voice interface system 110 is also adapted to identify high-level or important issues that were discussed and actions that were taken during a live meeting and provide a summary or meeting notes summarizing the live meeting.

As shown in FIG. 1, the voice interface system 110 may be operably coupled to a host service 120 via a network 106. The host service 120 may include one or more issue tracking servers 122, one or more databases 124, and one or more models 126. The issue tracking server 122 is generally configured to store, track, and modify groups of issue records that are associated with various projects or tasks that are performed by different teams. A distinct set of issue records may be associated with a particular project or team, which is the subject of the live meeting. The voice interface system 110 may be adapted to receive audio from one or more of the participants 104a-d of the live meeting and identify a set of issue records that is predicted to be relevant to one or more topics discussed during the live meeting. While the participants 104a-d are depicted as being located in a shared geographic location (e.g., in a common meeting room or meeting space), it is not necessary that all of the participants 104a-d be physically collocated. In accordance with some embodiments, one or more of the participants 104a-d may be attending the meeting via teleconference, video conference, or using another remote conferencing system to attend the live meeting.

In one example described herein, the set of issue records is associated with issues or tasks of a particular project during a weekly or daily stand-up meeting. In other examples, another set of items is obtained from the host service, which may correspond to a set of discussion points, topics, or other items to be discussed during the live meeting. In the present example, the issue records and other persistent stored computer items that may be modified during the course of the live meeting are stored on the host service 120. The host service 120 may also be operably coupled to the terminal device 102 by the network 106. The terminal device 102 includes a display that is configured to display a graphical user interface. The graphical user interface may mirror the discussion during the live meeting and, in the present example, may display a set of graphical objects that corresponds to a subset of the issue records or items that is associated with a topic of discussion during the live meeting. An example graphical user interface is described below with respect to FIG. 3.

As described herein, the voice interface system 110 may facilitate the live meeting by causing the display of the graphical user interface to be modified in accordance with the live discussion. For example, the issues, tickets, or other items displayed on the graphical user interface may correspond to a current topic being discussed by the meeting participants 104*a*-*d*. The voice interface system 110 may also cause elements of the various issues, tickets, or items to be edited or modified in accordance with audio received during the live meeting. The modifications or proposed edits may be viewed and, in some cases, confirmed by one or more meeting participants 104*a*-*d* through the graphical user interface. The voice interface system 110 may interface directly with the terminal device 102 to effect modifications to the graphical user interface. In some implementations, the voice interface system 110 causes modifications to the graphical user interface via the host service 120 over the network 106. In some implementations, the voice interface system 110 may be implemented using shared hardware or a common computer system with the terminal device 102.

As shown in FIG. 1, the voice interface system 110 may include various elements or components that may be adapted to perform the various functions associated with the voice interface system 110. In the present example, the voice interface system 110 includes an analyzer 114 and a flow interactor 112 that are adapted to extract data from live discussion provided during the meeting and identify one or more relevant issue records that are associated with the content of the discussion. The flow interactor 112 generally includes configurable components including rulesets for facilitating a particular type of meeting or meeting structure. For example, with respect to some of the embodiments described herein, the flow interactor 112 may be adapted to facilitate a regular status update meeting in which various tickets or issue records are reviewed, modified, and updated using the voice interface system 110. In other examples, the flow interactor 112 may be configured to facilitate anonymous feedback from a team or group during a live meeting. The flow interactor 112 may also be configured to facilitate brainstorming meetings, group collaboration meetings, board meetings, or any other structured or partially structured meeting format.

In general, the flow interactor 112 includes a template flow for the live meeting that is conducted in accordance with a ruleset or meeting guidelines. In one example, the flow interactor 112 includes a configurable module that is adapted to conduct a meeting in accordance with the processes described below with respect to FIGS. 4-6. While these are provided as sample illustrating examples, there are other meeting formats or structures for which the flow interactor 112 may be configured to facilitate.

The flow interactor 112 may be coupled to an analyzer 114, which may include a model that has been trained to analyze a data stream and identify one or more commands, actions, or tasks to be performed by the voice interface system 110 based on a received audio input. The analyzer 114 may be adapted to perform semantic analysis, syntax analysis, tokenization, and other language processing functions. As described herein, the analyzer 114 may include a machine learning algorithm that includes a Bayesian network, nodal network, or other predictive model that has been trained to correlate a text string or dataset with a particular command, task, action, or other function that is recognized by the issue tracking server(s) 122 of the host service 120. The analyzer 114 may have a hard-coded model that remains static with use or, alternatively, the analyzer 114 may adapt or modify the model over time to respond to common use cases and/or feedback received from the meeting participants 104*a*-*d* or other system users.

The flow interactor 112, alone or in conjunction with the analyzer 114, may be configured to identify one or more related issue records stored in the database 124 associated with the issue tracking server 122. The flow interactor 112 may work in conjunction with the analyzer 114 to interpret speech and voice commands received during a live meeting in order to effectuate changes to a set of issues that is identified as being relevant to the discussion during the live meeting. The flow interactor 112 may also work in conjunction with the model 126 of the host service 120, which may include high-level data, modal graphs, and other structural data that can be used to navigate and locate the various issue records stored in the database 124 of the host service 120.

The analyzer 114 and/or the flow interactor 112 may be configured to receive an analyzed dataset (e.g., a text string) that is based on audio received from the voice analyzer 118. The analyzer 114 may be configured to further analyze the dataset received from the voice analyzer 118 to extract key terms and/or phrases. The analyzer 114 may, in some instances, be configured to perform natural language processing in order to remove common terms or other language that may not be unique to the topic being discussed. The analyzer 114 may perform further processing in order to identify one or more of: a topic being discussed, a user being discussed, an activity associated with the topic, or an action to be performed.

The analyzer 114 may analyze the dataset using one or more natural language processing tools. For example, the dataset may be analyzed (and, optionally, normalized, lemmatized, parsed, segmented, part-of-speech tagged, stemmed, or otherwise preprocessed) to determine whether statistical inferences can be derived from the dataset. In one embodiment, text content derived from, or otherwise obtained from, audio received during the live meeting (as processed by the voice analyzer 118) can be segmented by words, phrases, or sentences to determine which content occurs most frequently. In many examples, text content from, or otherwise obtained from, the dataset and predicted to not be unique to a current topic of discussion can be likewise segmented by words, phrases, or sentences and extracted or ignored. In some implementations, the analyzer 114 may include a semantic analysis engine to identify specific phrasing or sentence structure that may include a specific action or type of input that is provided; leverage a text preprocessing analysis engine to tokenize, lemmatize, normalize, or otherwise simplify words of the voice input, to remove certain characters or phrases (e.g., newlines or stop words), and so on in order to generate a bag of words, bag of parts of speech, or any other numerical statistic(s) or metadata (e.g., length of text, number of sentences, number of tokens, lemma types) that may be compared to a database of previously-identified actions or commands.

The analyzer 114 may include or use a predictive model that may be adapted to extract or infer patterns within the dataset or text received from the voice analyzer 118. For example, the analyzer 114 can utilize any number of suitable techniques to identify signals of such patterns. Examples include, but may not be limited to, techniques including or leveraging: classification algorithms; supervised learning algorithms; probabilistic classification algorithms; Bayesian analysis algorithms; support vector machines; neural networks; deep-learning algorithms; decision trees; natural language processing algorithms; hierarchies of experts; Kalman filters; entropy-based models; and the like.

In this manner, a set of terms and phrases (collectively, herein "keywords" also referred to as a dataset or analyzed text) can be created by the analyzer 114 in which certain keywords used in a current discussion topic are associated with a statistical likelihood that a related issue request or issue record may exist. The analyzer 114 may, in cooperation with the flow interactor 112 and the issue tracking server(s) 122 of the host service 120, identify one or more issue records to be viewed and/or modified in accordance with the topic being discussed. Similarly, the analyzer 114, in conjunction with the flow interactor 112, may determine or compute a statistical likelihood that no related issue record exists and that a new issue record should be created. In one example, the analyzer 114 and/or flow interactor uses the keywords to identify an epic or story issue record that relates to a general topic, project, long term goal, or other construct that corresponds to a set of issue records associated with each other in the issue tracking server(s) 122, and creates or causes the creation of a new issue record having data extracted from or based on the epic or story issue record.

The flow interactor 112 and/or the analyzer 114 may, in some cases, be operably coupled to the model 126 of the host service 120 in order to identify a corresponding issue record stored in the database 124 associated with the issue tracking server(s) 122. In one example, the flow interactor 112, alone or in conjunction with the analyzer, analyzes the data stream received from the voice analyzer 118 in order to identify one or more keywords, phrases, or other attributes of the live discussion. The flow interactor 112, in conjunction with the model 126, may determine a similarity score, similarity metric, or other criteria with respect to the attributes of the live discussion and one or more issue records or tickets stored in the database 124. The similarity score may be a composite of multiple correlations including one or more of the following: a correlation between the speaker in the live meeting and an assignee of the issue record; a correlation between a keyword extracted from the dataset and a description or title of the issue record; a correlation between a keyword or topic extracted from the dataset and a name or description of a project, story, or epic associated with an issue record. The flow interactor 112 may determine a composite metric based on these factors and, in response to the metric satisfying a threshold, identify one or more corresponding issue records. The graphical user interface of the terminal device 102 may be modified to display content associated with the one or more identified issue records.

As shown in FIG. 1, the terminal device 102 may display content associated with one or more issue records identified by the voice interface system 110. The content may include a set of graphical elements or objects that corresponds to the various tickets or issues being discussed during the live meeting. Through the voice interface system 110 the content associated with the one or more tickets or issue records may be modified and the results of the modifications transmitted and/or stored by the issue tracking server(s) 122 of the host service 120. Depending on the implementation, the content may be modified through a series of vocal interactions with the voice interface system 110 and/or through interactions with the graphical user interface using a traditional mouse and keyboard.

In the present embodiment, the voice interface system 110 includes a voice analyzer 118 that may be operably coupled to the audio input device 111, which may include a microphone and/or other audio sensors that are configured to receive an audio or acoustic input. The voice analyzer 118 may be operably coupled to the audio input device 111 and may be configured to receive and process an audio stream captured by the audio input device 111 during the live meeting. In some implementations, the voice analyzer 118 receives the audio stream from a computer memory component that temporarily stores the audio stream before processing. The voice analyzer 118 includes one or more voice-to-text hardware and/or software elements that are adapted to convert an audio stream or signal into a dataset that includes text and, optionally, other elements. In some implementations, the voice analyzer 118 includes a signal processing element that may be configured to reduce background noise and/or enhance various characteristics of voice elements in the audio stream. The signal processing may occur using hardware elements that include low-pass filters, high-pass filters, bandpass filters, modulators, amplifiers, and the like. The signal processing may also occur, at least in part, using one or more digital signal processing techniques or elements.

The voice analyzer 118 may also include one or more modules or components that are adapted to convert an audio stream or signal into a dataset that includes text elements. The audio stream or signal may be preprocessed or otherwise conditioned prior to being converted by the respective modules or components of the voice analyzer 118. In some embodiments, the voice analyzer 118 calls or implements a tool that includes a Hidden Markov Model (HMM) that divides the audio stream or signal into fragments for which one or more coefficients or vectors are computed. The series of coefficients or vectors may be matched to one or more phonemes or units of speech, which may be used to determine corresponding text. In some cases, the voice analyzer 118 implements the voice-to-text processing locally in the voice interface system 110. In other cases, the voice analyzer 118 may utilize one or more remote modules or computing systems to perform the voice-to-text computations and analysis. The voice analyzer 118 may include one or more modules or software developer kits that implement one or more of the voice-to-text protocols or elements. The voice analyzer 118 may perform the voice-to-text processing using a synchronous, asynchronous, streaming, or other architecture for processing the audio received from the audio input device 111.

In the present embodiment, the voice interface system 110 includes a voice synthesizer 116 that may be operably coupled to the audio output device 113, which may include a speaker or other hardware elements that are configured to produce an audible or acoustic output. The voice synthesizer 116 may be configured to receive text or other input and produce an audible speech output using the audio output device 113. In some implementations, the voice synthesizer 116 is operably coupled to the flow interactor 112, which outputs a dataset or text string that is to be configured to human audible speech. The voice synthesizer 116 may include one or more text-to-speech (TTS) components that are configured to convert a text string into an audio signal that is recognizable by a user as speech. The voice synthesizer 116 may include a combination of hardware and software elements that perform TTS operations. For example, the voice synthesizer 116 may include one or more models, such as a Hidden Markov Model (HMM) or a neural network that is specially configured to determine suggested words and pronunciation in the text stream. The voice synthesizer 116 may also include one or more sound synthesis elements that are configured to construct a series of phonemes that can be used to produce the audio speech output. The voice synthesizer 116 may include one or more modules or software developer kits that implement one or more of the TTS protocols or elements. The voice synthesizer 116 may also include various amplifiers, signal conditioning elements, or other hardware components that are used to produce the audio signal that is sent to the audio output device 113 to produce the speech output.

FIG. 1 represents one schematic representation of system 100 having a networked or cloud-based architecture. In the illustrated embodiment, the system 100 is implemented with a client-server architecture including a host service 120 that communicably couples (e.g., via a network 106 that includes one or more networking or wired or wireless communication protocols) to the voice interface system 110 and the terminal device 102. The host service 120 may also be operably coupled (via the network 106) to one or more client devices 105a-d that are associated with or operated by the meeting participants 104a-d. It may be appreciated that other client devices, terminal devices, workstations, or other devices may be configured in a substantially similar manner as the client devices 105a-d, although this may not be required of all embodiments and different client devices can be configured differently and/or may transact data or information with, and/or provide input(s) to, the host service 120 in a unique or device-specific manner.

The voice interface system 110 may be implemented on a computing platform that includes a processor or a processing unit, volatile or non-volatile memory (identified, collectively, as the memory), and a display. An example voice interface system is described below with respect to FIG. 7. In some cases, the voice interface system 110 and the terminal device 102 are implemented on a shared computing platform and, in some cases, may operate using shared hardware components. In some implementations, the voice interface system 110 and/or the terminal device 102 are implemented on a laptop computer, desktop computer, virtual workstation terminal, or other computer hardware platform.

The client devices 105a-d can be any suitable personal or commercial electronic device and may include, without limitation or express requirement, a processor or processing unit, volatile or non-volatile memory (identified, collectively, as the memory), and a display. Example electronic devices include, but are not limited to: laptop computers; desktop computers; cellular or mobile phones; tablet computing devices; and so on. It may be appreciated that client devices 105a-d, such as described herein, can be implemented in any suitable manner.

In many embodiments, the processor of the client devices 105a-d can be configured to execute an application (herein referred to as a "client application" or an "issue tracking client application") that is executed or run using the processor or processing unit of the client device and may be stored, at least in part, in the memory. The client application may include a graphical user interface that is configured to display content generated by the host service 120 and/or the voice interface system 110. The client application may also be configured to produce a graphical user interface having a set of fields or other template for receiving user input regarding an issue request or ticket. The client application is configured to access and communicate with the host service 120 and to securely transact information or data with, and provide input(s) to, the host service 120. In some embodiments, the client application may be a browser application configured to access a web page or service hosted by the host service 120 that is accessible to the client devices 105a-d over a private or public network that may, in some embodiments, include the open internet. The client application may be configured to display the graphical user interface through the browser and/or a dedicated issue tracking software application. In some cases, the graphical user interface is adapted to the display of the client device and may be presented in a mobile format or full format depending on the size and/or resolution of the client device display.

As shown in FIG. 1, the host service includes a model 126, which may be used to identify and access one or more of the issue records stored in the database 124 associated with the issue tracking server 122. The model 126 may be accessed by the voice interface system 110 to identify one or more issue records that are relevant to the current discussion or the live meeting. In particular, the flow interactor 112 may send one or more datasets to the model 126, which may be configured to identify one or more issue records that have a predicted relevance or threshold similarity to the respective datasets. For example, in one embodiment, data consumed by the model 126 can be analyzed to determine that a dataset including the keyword "update localization strings" is known to not be associated with any related issue requests or reports whereas the keyword "integrate third-party API" is known to be associated with at least one related issue request or report.

In still further examples, data consumed by the model 126 can be analyzed in a different manner to further train or define a behavior of the host service 120; for example, in some embodiments, one or more topic modeling operations (e.g., Latent Dirichlet Allocation operation(s), Non-negative Matrix Factorization operation(s) and so on). In this example, clusters of (optionally, lemmatized) words or phrases related to a particular topic model or other semantic structuring can be added to a database and flagged as associated with issue requests or reports known to be associated with at least one other issue request or report or, alternatively, associated with no other issue requests or reports.

In many embodiments, the host service 120 is configured to operate within or as a virtual computing environment that is supported by one or more physical servers including one or more hardware resources such as, but not limited to (or requiring) one or more of: a processor or processing unit; a memory; non-volatile storage; networking connections; and the like. As used herein, a processor of the host service 120 may refer to one or more physical processors or processing units implemented on one or more physical computing systems that, alone or together, can be configured to implement the functionality described herein. The host service 120 may be implemented on a single computing system or using a distributed network of computing systems. For simplicity of description and illustration, the various hardware configurations associated with a processor, computing device, or hardware architecture are not shown in FIG. 1. Hardware aspects of the host service 120 may correspond to the hardware of the voice interface system 110 described below with respect to FIG. 7. In general, the hardware of the host service 120 may be distributed across multiple servers or physical computing devices in order to allow for scalability and remote access from a variety of geographic locations.

In many embodiments, the host service 120 and the voice interface system 110 can include a number of discrete subservices or purpose-configured modules, containers, or virtual machines each configured to perform, coordinate, serve, or otherwise provide one or more services, functions, or operations of the host service 120 or the voice interface system 110. Example operations include the capture and analysis of audio during a live meeting; determine a relevance percentage for one or more issue records and identify one or more relevant issue records stored in the database 124 of the host service 120; prompt the meeting participants for voice input; and modify relevant issue records in accordance with received voice input. In the example of FIG. 1, the host service 120 includes one or more issue tracking server(s) 122, which may be used to track the various tickets, issues, issue records, and other information associated with the system 100. As described above, the issue tracking server(s) 122 may be operably connected to (or may include) one or more database(s) 124 that are used to store the data and other information used by the issue tracking server(s) 122. As described herein, the system 100 also includes a voice interface system 110 having various elements that are configured to serve as the interface between the participants 104a-d of the live meeting and the issue tracking server(s) 122 of the host service 120. Specifically, the voice interface system 110 may be configured to perform one or more of the operations described below with respect to the examples of FIGS. 2-6, as described in more detail below.

Figure 2:
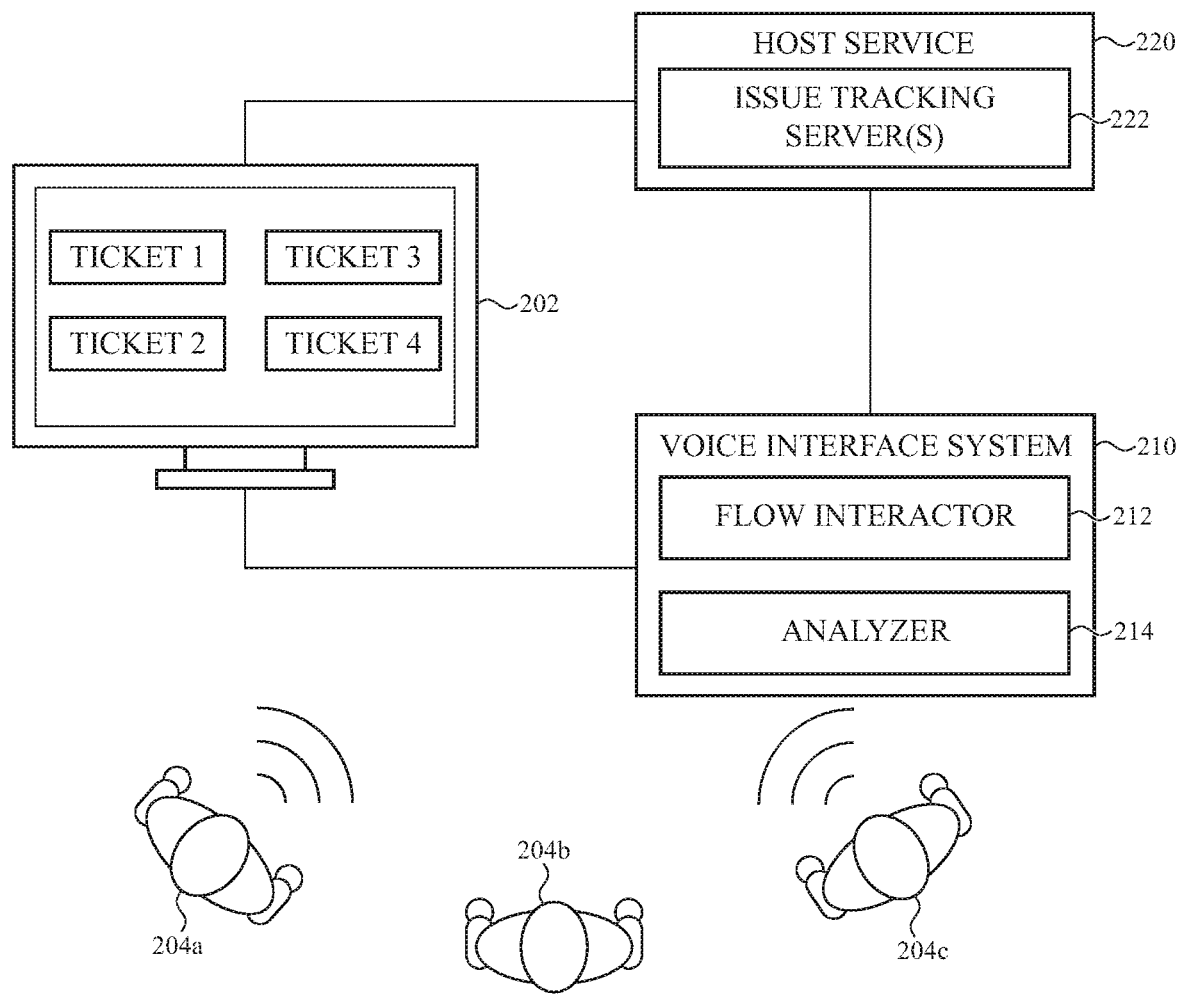
FIG. 2 is a signal flow diagram of an issue tracking system having a voice interface system.

FIG. 2 depicts an example process flow for an issue tracking system 200. The process flow of FIG. 2 may correspond to any or all of the example embodiments described herein. Further, the actual process flow of any particular issue tracking system may include elements not included in the example of FIG. 2, which is a simplified illustration.

As shown in FIG. 2, a terminal or client device 202 may run or execute a client application that generates a graphical user interface. The graphical user interface may allow the user to manipulate a series of issues or tickets, as required during a live meeting or event. As shown in the simplified example of FIG. 2, the graphical user interface depicted on the terminal or client device 202 includes graphical elements that correspond to ticket 1 and ticket 2, which may be discussed and modified during the course of a live meeting or event. (Another example of a graphical user interface is provided in FIG. 3, discussed below.) In general, the graphical user interface may allow the user to perform one or more manipulations including, for example, issue creation, issue modification or editing, add narratives to an issue, and issue deletion, or closure. These example manipulations are provided by way of illustration and are not intended to be limiting.

As shown in FIG. 2, the terminal or client device 202 is operably coupled to a voice interface system 210. The terminal or client device 202 may be operably coupled to the voice interface system 210 by a network connection or other electronic communication scheme. The voice interface system 210 may include many or all of the elements or components described above with respect to the example of FIG. 1 including, for example, a flow interactor 212, an analyzer 214, an audio input device, an audio output device, a voice synthesizer, a voice analyzer, and other components. A description of these elements or components is not repeated for clarity and to reduce redundancy. The terminal or client device 202 is also operably coupled to a host service 220, which may include one or more issue tracking server(s) 222, databases, and models, as described above with respect to FIG. 1. Again, redundant description of the various components of the host service 220 are omitted for clarity.

In an example embodiment, the voice interface system 210 is configured to facilitate a live meeting with a group of participants 204a-c. While the participants 204a-c are depicted as being located in a shared geographic location (e.g., in a common meeting room or meeting space), it is not necessary that all of the participants 204a-c be physically collocated. In accordance with some embodiments, one or more of the participants 204a-c may attend the meeting via teleconference, video conference, or using another remote conferencing system to attend the live meeting. Such remote attendees may be considered attending participants for purposes of the embodiments described herein.

The system 200 may be used to conduct or facilitate a live meeting. The live meeting may be a regular status meeting or team update meeting that occurs on a regular or semi-regular basis. An objective of the meeting may be to collect a status update from the various participants 204a-c with respect to a set of issues (represented by issue records) that are associated with a particular project. In general, the subject matter of the meeting is directed to a discrete project or a discrete set of issue records for which the participants 204a-c are associated. The graphical user interface displayed by the terminal or client device 202 may be modified in accordance with the topics and issue records being discussed during the meeting and may display updated or modified content that has been generated by the voice interface system 210 in accordance with the discussion.

As described herein, a voice interface system 210 may be used to facilitate the meeting by prompting participants 204a-c, causing the display of the client device 202 to show relevant content, and conducting the meeting in a way that is both structured is format but also in a natural or human-seeming way. The voice interface system 210 may also provide a summary of actions or modifications performed, which may serve as meeting notes or a transaction log for reference later by the participants or to notify users not attending the live meeting.

In one example, the terminal or client device 202 may launch the graphical user interface, which may be generated by a client application that is executed or running on the client device 202. The client application may include a dedicated client program and/or be implemented as a web-based interface through a browser or other web-based tool. The content displayed on the graphical user interface may include graphical elements or objects that correspond to issue records or tickets that are being tracked by one or more issue tracking server(s) 222 of the host service 220.

In the example of FIG. 2, the terminal or client device 202 is depicted as being separate from the voice interface system 210. However, in some implementations, the voice interface system 210 may be implemented on or integrated with the terminal or client device 202. As described previously, the voice interface system 210 and the terminal or client device 202 may have shared hardware or may be implemented on the same hardware platform. In some cases, the voice interface system 210 may be referred to generally as a terminal device, a client device, or other device or system.

The terminal or client device 202 may be adapted to identify a project or set of issue records that is relevant to the discussion of the live meeting. In one example, one of the participants 204a-c selects a project or set of issue records manually through the client application running on the terminal or client device 202. In another example, the voice interface system 210 is adapted to monitor an initial portion of the meeting or discussion to identify a project name or set of tasks to be discussed. In one specific example, one or more of the participants 204a-c may announce the name of the project (e.g., "Let's start the meeting, which is a team project update for project ABC"), which may be detected by the voice interface system 210. In accordance with the example provided above with respect to FIG. 1, the voice interface system 210 may include a voice analyzer that is configured to convert detected audio or speech to text and an analyzer 214 that is configured to recognize or identify commands or actions within the converted text. The analyzer 214 may be adapted to identify a tokenized or predefined action that corresponds to content extracted from the voice input. In response to an announcement of the project name or set of issues, the voice interface system 210 may communicate with the host service 220 to identify a relevant set of issue records and, in some cases, may cause the host service 220 to transmit content related to the set of issue records to the terminal or client device 202. The graphical user interface may be modified to display graphical objects that include content from the relevant set of issue records.

After the project or set of issues have been identified, the voice interface system 210 may be adapted to query or prompt respective participants for an update. In one example, the voice interface system 210 is configured to address each of the relevant issues or tickets one-by-one with the meeting participants 204a-c. This functionality may be directed by the flow interactor 212, which may be configured to conduct a particular meeting flow or progression. In one example implementation, the flow interactor 212 of the voice interface system 210 may be adapted to select a respective issue record and prompt a participant for a response to be provided as voice input. In some cases, the flow interactor 212 may be adapted to identify an assignee or user associated with the issue record and direct the prompt directly to a participant that corresponds to the assignee or user (or is representing the assignee or user for purposes of providing a status update). This provides a more human interaction between the voice interface system 210 and the participants 204a-c and also makes it more clear from whom a verbal response is expected. If the assignee or addressee of the prompt is incorrect, the participants 204a-c may provide this feedback to the voice interface system 210, which may modify the assignee for the issue record, add an assignee for the issue record, or note the addressee as a representative of the assignee. These are mere examples and other actions may also be taken.

In response to the prompt from the voice interface system 210, the respective participant (e.g., participant 204a) may provide voice input to the voice interface system 210. The voice input may include a brief narrative regarding the current status of the issue, past work performed on the issue, and/or future plans with regard to the issue. In some instances, the voice interface system 210 is adapted to assume that the participant that is speaking is the user or assignee associated with the issue or ticket (or is representing the assignee or user for purposes of providing a status update).

In some implementations, the flow interactor 212 of the voice interface system 210 may be adapted to present a series of audio prompts (e.g., synthesized speech prompts) that are specially adapted to extract key details about the status of the respective issue or ticket from the group of meeting participants 204a-c. For example, the voice interface system 210 may be configured to produce a series of synthesized speech prompts for each issue being discussed during the live meeting. The series of prompts may be adapted in accordance with content associated with the respective issue record or ticket being discussed. For example, the issue record may include a main description and one or more tasks that are to be completed in order to advance the progress of the issue record. The flow interactor 212 of the voice interface system 210 may be configured to extract content from the issue record in order to customize or adapt the prompts to correspond to the content or issue being discussed.

The series of prompts may include a first prompt that includes synthesized speech that is directed to recent past activity that was performed with respect to the issue or ticket. In response to the first prompt, one or more of the participants 204a-c may provide a voice input that is detected by the voice interface system 210. The response may include a brief description of the past activity and may include a description of a task that was performed and whether the task was completed or is in progress. The analyzer 214 may be adapted to interpret content extracted from the voice input (as processed by a voice analyzer or other voice-to-text converter) and determine whether one or more tasks were completed and a brief description of the tasks that were completed, along with other relevant information. The flow interactor 212 of the voice interface system 210 may be adapted to take an appropriate action in response to the voice input as interpreted by the analyzer 214. For example, the voice interface system 210 may be adapted to interface with the issue tracking server 222 of the host service 220 in order to update a progress on a task that is associated with the respective issue record. If the voice input does not correspond to an existing task, the voice interface system 210 may cause a new task to be added to the respective issue record.

The series of prompts may include a second prompt that includes speech directed to present or planned tasks or activities that the participant or team plans to perform or complete. In response to the second prompt, one or more of the participants may provide voice input that is detected by the voice interface system 210. In response to the voice input, the voice interface system 210 may be configured to identify an existing task that is associated with the issue record and/or create a new task or item for the respective issue record. The intended action for the respective task may be stored or recorded for the respective issue record and, in some cases, an estimated time or completion date may be modified or revised.

The series of prompts may also include a third prompt, which may include speech that queries the user for any issues, problems, or questions that the participant may have about a task, the issue, or other content associated with the issue record. The participants' 204a-c voice input provided in response to this prompt may be converted by the voice interface system 210 to a text narrative and added to the issue record. In some instances, an additional user or participant 204a-c is added to the issue record in accordance with the voice input, particularly if the voice input requires action from a user not currently associated with the issue record.

The series of prompts may also include a fourth prompt that includes speech that requests information about blockers, blocking tasks, new tasks, or other activities that may be preventing or impeding the progress on the ticket or issue. In response to this prompt, one or more of the participants 204a-204c may provide voice input that is detected by the voice interface system 210. In response to the voice input, the voice interface system 210 may create one or more additional tasks, issue records, or other items that are to be stored and tracked by the issue tracking server 222 of the host service 220.

While in some embodiments the voice interface system 210 is configured to provide explicit speech prompts to obtain different aspects of the status update from the user, in some embodiments the voice interface system 210 may be configured to receive voice input and determine a classification or type of status update being provided. For example, in one embodiment, the voice interface system 210 may provide a generic speech prompt that requests a status update from one or more of the participants 204*a-c*. In response, the one or more participants 204*a-c* may provide an audible input that includes a brief description of their status with respect to a particular issue or task. The analyzer 214 (receiving a dataset or text from a voice analyzer or other voice-to-speech converter) may be adapted to analyze extracted content from the voice input and, either alone or in combination with the flow interactor, determine or classify the input as belonging to one or more of multiple discrete input types. For example, the analyzer 214 may classify the voice input as being related to past activity, current activity, planned activity, or as being related to an issue or problem. The analyzer 214 may include a predictive model (implemented using a Bayesian network or other machine learning tool) that is adapted to recognize elements of the voice input, such as the verb tense, time elements, and sentence structure, which may be used to classify the voice input.

In accordance with the classification or the type of voice input that is provided, the voice interface system 210 may take a different or discrete action. The voice input can be classified based on either or both of: the type of prompt that was produced to elicit the voice input or by using a predictive model implemented by the analyzer 214. For example, in response to the voice input being classified as being related to past activity, the voice interface system 210, in conjunction with the issue tracking server 222 of the host service 220, may modify a status of a corresponding issue record. The status may be changed, for example, from "in progress" to "complete." In response to the voice input being classified as being related to current or planned activity, the voice interface system 210 may modify the corresponding issue record to include content (e.g., a narrative or description) that corresponds to the planned activity. In response to the voice input being classified as being related to a problem or issue, the voice interface system 210 may be configured to add or edit content of the respective issue to include problem or issue information that is extracted from the voice input. In some instances, the voice interface system 210, in conjunction with the issue tracking servers 222, may create a new issue record that is directed to the problem or issue identified in the voice input.

In general, the voice interface system 210 may be adapted, through the flow interactor 212, to prompt the participants 204*a-c* for voice input with respect to each issue record of the set of issue records that is associated with the live meeting or the project being discussed during the live meeting. Each voice input may be analyzed by the voice interface system 210 so that appropriate action can be taken with respect to each issue record as they are being discussed. For example, the voice interface system 210 may provide a first speech prompt that is directed to a first or current issue record being discussed during the live meeting. In response, one or more of the meeting participants 204*a-c* may provide voice input that is detected or received by the voice interface system 210. As described previously, the voice interface system 210 may detect the voice input using an audio input device that includes a microphone or other audio sensor. The output of the audio input device may be passed to a voice analyzer that converts the audio signal into text or a dataset, as described above with respect to example of FIG. 1. The dataset or text may then be passed to the analyzer 214, which may include a predictive model that is adapted to an action associated with the voice input. For example, the analyzer may be adapted to identify a tokenized or predefined action that is associated with content extracted from the voice input. The analyzer 214 may also be adapted to identify one or more topics, a voice input type, or other characteristic of voice input. The predictive model of the analyzer 214 may be trainable or able to be modified over time with use to better predict the action and/or other characteristic of the voice input through repeated exposure to similar content.

The flow interactor 212 may be adapted to take output from the analyzer 214 in order to direct action to be taken. Specifically, the flow interactor 212 may work with the issue tracking server 222 to perform an action with respect to the current issue record, may cause content or graphical objects to be displayed on the terminal or client device 202, and/or cause further speech prompts to be produced. In some cases, the flow interactor 212 may be adapted to take content extracted from the voice input and edit or revise structured fields of the issue record. Structured fields may include, for example, issue description, issue type, issue assignee, issue status, issue progress narrative, and so on.

The flow interactor 212 or other element of the voice interface system 210 may be adapted to identify a relevant issue from the predefined set of issue records that is associated with a project or subject matter of the live meeting. For example, the flow interactor 212 may be adapted to determine a relevance percentage for extracted content or a dataset with respect to one or more issue records being tracked by the issue tracking server 222. The flow interactor 212 may determine a separate relevance percentage for each of the issues and select or identify a relevant issue record based on that issue record having the highest relevance percentage vis-a-vis the extracted content or dataset. In other embodiments, the flow interactor 212 is adapted to select or identify one or more relevant issue records in response to the respective relevance percentage exceeding a threshold. The relevance percentage and/or the threshold may be dynamic and may be adjusted in accordance with user feedback or through feedback received due to repeated use and various positive (or negative) outcomes.

The relevance percentage may be computed any one of a number of different ways. In one example, the relevance percentage is a numerical quantification of a degree of correlation between content extracted from the voice input and text of the respective issue record. In some instances, the correlation is weighted to increase the score when unique or non-common terms (e.g., names, places, products) have a correlation (as compared to common articles, verbs, and other commonly used terms). The relevance percentage may be measured on a scale of 0% to 100% but this is not necessary. In some implementations, the relevance percentage is a relative measure of correlation or similarity between extracted content and content of the issue record, which may be represented by any appropriate numerical quantity. For ease of use, the term "percentage" is used because there is a theoretical 100% relevance when the content is identical and a theoretical 0% relevance when the content does not overlap at all. However, in practice, the relevance percentage may be normalized in a way that does not correspond to a traditional 100% percentage or may not be normalized at all. Because the issue records and the corresponding content is inherently structured in nature, it may not be necessary to normalize the actual relevance percentage. Similarly, the threshold may also be represented as a percentage but it is not necessary that it be so. In some cases, the threshold is between 90% and 95%. In some cases, the threshold is between 80% and 90%. In some cases, the threshold is between 70% and 80%. In some cases, the threshold is between 60% and 70%. In some cases, the threshold is between greater than 50%.

There are scenarios in which the voice interface system 210 cannot identify an issue record having a sufficient relevance percentage with respect to the content extracted from the voice input. In these scenarios, the voice interface system 210 may be adapted to determine relevance percentage for the extracted content with respect to an epic issue record, story issue record, or other issue record that relates to a broader theme or construct for a particular project. An epic issue record, for example, may relate to a long term goal or set of product features that represents a broader theme or subject than a traditional issue record. Similarly, a story issue record may relate to a certain function or desired end-user feature that represents a broader theme than individual tasks or actions that are generally associated with a traditional issue record. If the relevance percentage exceeds a particular threshold (e.g., an epic threshold), the voice interface system 210 may cause or direct the creation of a new issue record having content that relates to the identified epic issue record. The new issue record may also be populated with content extracted from the relevant voice input (for which no other relevant issue record could be identified).

As described previously, the voice interface system 210 may be configured to effect or initiate modifications of respective issue records being tracked by the issue tracking server 222 of the host service 220. In general, the voice interface system 210 may be adapted to (through the issue tracking server 222) edit content of a respective issue record, add content to a respective issue record, change the status of a respective issue record, create a new issue record, close or delete an issue record, and perform one or more other types of action with respect to the various issue records being tracked by the issue tracking server 222. In the example of FIG. 2, the voice interface system 210 may effectuate or implement modifications to the various issue records by either directly interacting with the host service 220 or by interacting with the host service 220 through the terminal or client device 202. As described above, the voice interface system 210 and the terminal or client device 202 may be implemented on a shared or common hardware platform, which may minimize the distinction between these two alternative communication schemes.

As described previously, the graphical user interface may be adapted to reflect the changes or modifications being performed by the voice interface system 210. For example, if one or more issue records are selected or identified by the voice interface system 210 (in response to voice input or otherwise), a graphical object or content related to the selected or identified issue record may be displayed on the display of the terminal or client device 202. Similarly, if one or more issue records are edited or modified by the voice interface system 210 (in response to voice input or otherwise), a graphical object or content related to the selected or identified issue record may be modified in accordance with the modification implemented using the voice interface system 210. By way of example, a change in a status or progress of an issue record, as implemented by the voice interface system 210, may result in a movement or other visual perceptible change in the display of the corresponding graphical object. With respect to some of the examples provided herein, the graphical object may be moved from an "in progress" column to a "completed" column in response to the status of the issue record changing from "in progress" to "complete."

In general, the graphical user interface produced by the client application running on the terminal or client device 202 may be updated continuously in accordance with actions directed by the voice interface system 210. This allows the participants 204a-c to view the activities and modifications being performed, as they are occurring, and to take appropriate corrective action if a voice response or voice input is misinterpreted or to redirect a course of action to reflect the intent of the team. In some instances, the voice interface system 210 may appear to be implementing the changes through the graphical user interface while, however, the graphical user interface is merely reflecting the modifications that have been implemented through the host service 220. In some cases, the graphical user interface may be adapted to provide an animation or graphical simulation that gives the appearance that the changes are being directed through the graphical user interface rather than being updated directly through the host service 220. In other embodiments, the voice interface system 210 may actually implement the changes through the graphical user interface using an advanced programming interface (API) or other interface that allows for control of the client application running on the terminal or client device 202 by the voice interface system 210.

The voice interface system 210 may also be adapted to maintain a log or summary of the various actions that were taken during the live meeting. For example, the voice interface system 210 may be adapted to create a transaction log of all actions taken as a result of voice input and other input received during a live meeting. The transaction log may be filtered to extract minor transactions or actions and/or to highlight more important actions. A filtered and formatted version of the transaction log may be transmitted (via e-mail, message, or other electronic communication) to one or more of the meeting participants 204a-c. In some cases, a meeting summary is transmitted or made available to users that did not attend the live meeting in a way to keep them informed of the team's activities.

Figure 3:
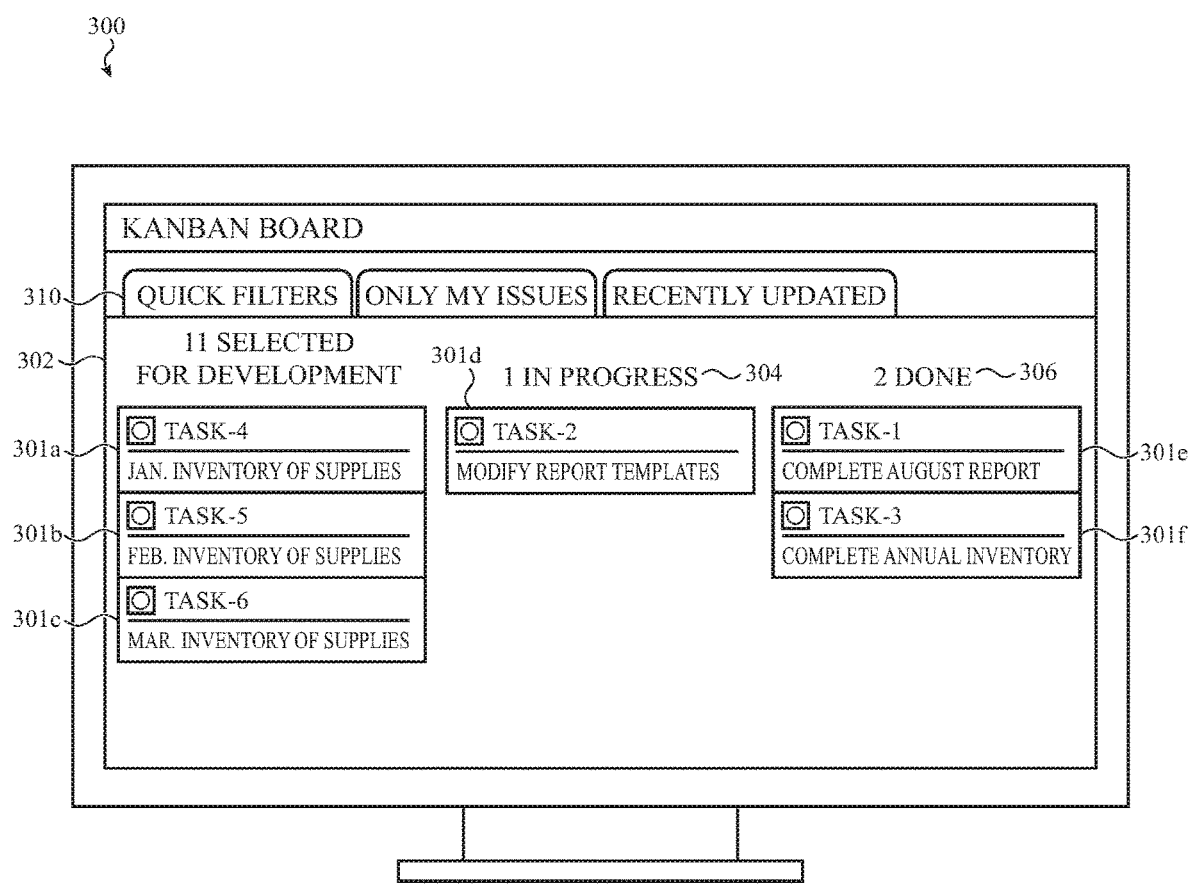
FIG. 3 depicts an example graphical user interface displayed on a terminal or client device.

FIG. 3 depicts an example graphical user interface 300 that may be displayed on a terminal or client device. The graphical user interface 300 may be generated by an issue tracking client application, which may include graphical objects remotely generated and viewed through a web browser and/or may include graphical objects that are generated locally on the client device by a dedicated issue tracking client application.

The current example depicted in FIG. 3 corresponds to a Kanban Board that may be displayed as part of a weekly or regularly occurring stand-up meeting. As shown in FIG. 3, the interface may include graphical elements that correspond to one or more issue records (also referred to herein as tickets or issues) that are being tracked by an issue tracking system. In this example, the graphical elements or objects are labeled as tasks 301a, 301b, 301c, 301d, 301e, 301f. With regard to this example, the terms "tasks," "issues," and "tickets" may be used to refer to the same issue record or item that is being tracked by the issue tracking system. That is, each of the various tasks 301a, 301b, 301c, 301d, 301e, 301f may correspond to one or more issue records that are tracked by the issue tracking system.

As shown in FIG. 3, the various tasks 301a, 301b, 301c, 301d, 301e, 301f may be grouped by status. A first group of tasks 301a, 301b, 301c, are identified as having a first status 302 ("Selected for Development"). A second set of tasks 301d are identified as having a second status 304 ("In Progress"). A third set of tasks 301e, 301f are identified as having a third status 306 ("Done"). The tasks may also be organized or filtered in accordance with one or more tabs 310, that allow easy navigation between different groups of tasks. The depicted grouping is provided by way of example and is not intended to be limiting in nature.

As described previously, the voice interface system may be used to manipulate or modify the various tasks (corresponding to issues or tickets) in a variety of ways. Additionally, a user or meeting participant may manipulate or modify the various tasks through the graphical user interface in ways that are similar to the manipulations of the voice interface system. This allows for dual control and gives the meeting participants the ability to correct an action or manually implement changes without having to use the voice interface system. In one example, the user may drag and drop (or otherwise move) the various graphical objects associated with respective issues between the groups to indicate a change in status of the respective item. Changing the status of one or more items may result in an issue modification request being transmitted to a host service, which may edit or otherwise modify an existing issue record. Similarly, the voice interface system may cause the display of the various graphical objects to change to reflect a change in status of the respective item implemented through the voice interface system. Control of the graphical user interface 300 may be provided through one or more API elements or through another interface that allows the voice interface system to control the client application generating the graphical user interface 300. In other cases, the graphical user interface 300 is merely updated as data or information related to the various tasks 301a, 301b, 301c, 301d, 301e, 301f are updated on a back-end host service or issue tracking server.

The graphical user interface 300 may be modified by the user or the voice interface system to expand items or drill down to expose additional content for viewing and editing. For example, the various tasks may be manipulated by manually selecting a respective task, which may open or enlarge the respective task in a window and present the user with a series of user-editable fields and/or user-selectable options. User interaction with a particular field or selectable option in the displayed task may also result in an issue modification request being transmitted to a host service, which may edit or otherwise modify an existing issue record. Example modifications include without limitation, changing task status, changing or adding a task assignee, adding a comment or note, adding a linked task or issue, and so on. The various modifications that are performed using the graphical user interface may result in the edit or modification of an existing issue record, the creation of a new issue record, and/or the deletion or closure of an existing issue record.

As described herein, a voice interface system may implement some or all of the same actions to a respective issue tracking server or host service rather than by direct control of the graphical user interface 300 (through use of an API or other interface). The various changes, modifications, or actions performed by or implemented using the voice interface system may be reflected in a modified graphical output in a way that may mimic a manual manipulation through the graphical user interface. For example, modifications may be animated or graphical transitions may be provided to simulate actions being taken, even though the actions may have already occurred through the host service or issue tracking server. In this way, the voice interface system may be used to drive the meeting and visually present the results of the various updates as the meeting progresses in a way that is similar to a human or participant-run meeting.

In one example, a status of a task is changed, through use of the voice interface system, from "in progress" to "complete." In accordance with the change in status, the graphical object representing the respective issue record may move from the "in progress" column 304 to the "done" column 306. Similarly, if the description of a task is changed through use of the voice interface system, the respective content displayed in the respective graphical object may be updated or modified to reflect the change. Similarly, the graphical user interface may be adapted or modified to reflect added or deleted or closed tasks or issues that result from action taken by the voice interface system.

Figure 4:
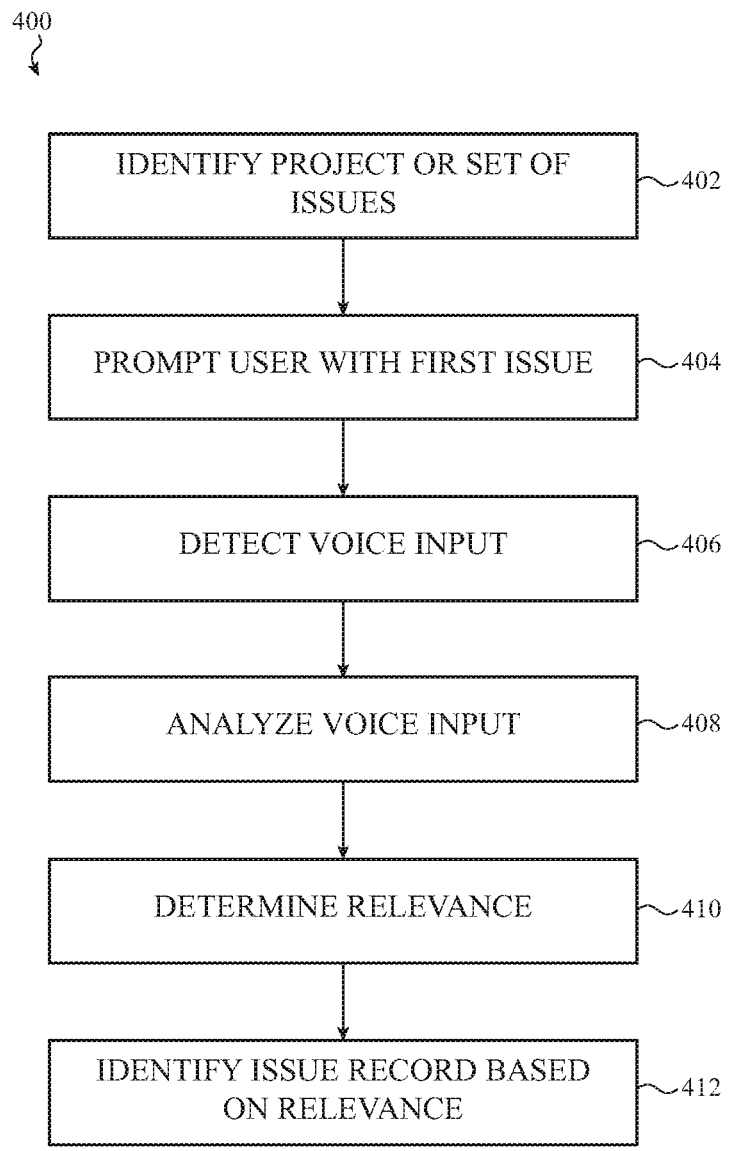
FIG. 4 is an example process for operating a voice interface system.

FIG. 4 depicts an example process 400 for modifying an issue record tracked by an issue tracking system using a voice interface system. The process 400 may be implemented using one or more of the issue tracking systems and voice interface systems described herein. In accordance with some embodiments, one or more operations of the process 400 may be omitted. Likewise, the process 400 may not be inclusive of all operations or steps, depending on the implementation.

In operation 402, a project or set of issue records is identified. The project or set of issue records will be those issues or tasks that are to be discussed during the live meeting and for which participant updates will be provided. As described previously, the voice interface system may be adapted to identify a project or set of relevant issue records based on voice input detected or received during the live meeting. In one example, the voice interface system may use an analyzer module (e.g., analyzer 114, 214) to extract content from voice input, which may correspond to a project name or a meeting topic. In response, the flow interactor (e.g., flow interactor 112, 212) may query an issue tracking server to identify a project or set of issue records that corresponds to the extracted content. In some cases, the set of issue records or project has a similarity score that exceeds a specified threshold with respect to the extracted content. Additionally or alternatively, the issue tracking system may be adapted to receive a user selection of the relevant set of issue records or project. For example, a terminal or client device may include a graphical user interface through which the user can select or identify the relevant set of issue records or a project that is associated with a specific set of issue records.

In operation 404, an audible prompt is provided to one or more of the participants of the live meeting. As described previously with respect to the examples provided herein, the audible prompt may include synthesized speech that is produced using the flow analyzer, voice synthesizer, and audio output device of the voice interface system. In some instances, the audible prompt includes content that has been extracted from a respective issue record in order to customize or personalize the prompt to address the issue or task being discussed.

In operation 406, a voice input from the first participant is detected using an audio input device of the voice interface system. In operation 408, the voice input is analyzed to produce a dataset including a set of keywords. As described previously, a voice analyzer may be used to convert the audio input into a dataset or string of text, which may be further processed using an analyzer to extract content that can be used to update the issue record. As discussed previously, the analyzer may be adapted to perform one or more language processing techniques (e.g., lemmatization, segmentation, stemming, parsing, part-of-speech tagging) in order to obtain the extracted content, which includes the analyzed dataset or set of keywords. In some cases, the voice input is analyzed to determine one or more actions to be performed. As described previously, the flow interactor may be adapted to determine one or more actions to take in response to the analysis of the voice input.

In operation 410, a relevance for the dataset with respect to at least a first issue record of the set of issue records is determined. The relevance is generally a numerical representation of the amount or degree of correlation between the dataset or keywords produced in operation 408 with respect to a respective issue record. As described herein, the relevance may be measured or estimated using a relevance percentage, which may be a normalized or non-normalized numerical representation of the correlation between the dataset or keywords and content extracted from the respective issue record. The content extracted from the issue record may include the issue title, issue description, and/or other relevant narrative or text field that indicates the subject matter of the issue record. The relevance percentage may be based on a statistical correlation between the keywords and the content of the issue record. In some cases, the relevance percentage is an indication of the number of common terms between the dataset or keywords and the content extracted from the issue record. In some cases, the correlation is weighted to emphasize correlation between proper nouns, key phrases, and active verbs and other terms that may indicate relevance.

In operation 412, an issue record is identified based on the relevance computed in operation 410. In one example, a relevance (e.g., a relevance percentage) is computed for multiple issue records of the set of issue records. An issue record having the highest or strongest relevance may be identified in accordance with operation 412. In another example, issue records having a respective relevance percentage that exceeds a threshold are identified. This may result in multiple potentially relevant issue records being identified by the system. In some cases, the system will provide further voice or visual prompts to the user to allow selection of an issue record from a group of multiple potentially relevant issue records. The user selection may be used as positive or negative feedback by the system to improve future relevancy determinations. In some cases, the threshold and/or the relevancy percentage computation are dynamically adjusted in response to the feedback received from the user or participant.

The identified issue request or issue requests may be modified in accordance with the voice input or with subsequent voice input. The voice interface system, using a flow interactor, may request modification of the identified issue record(s) to edit content, add content, change status, or perform other modifications to the identified issue record(s). In response to the modifications, the system may display the modifications on the graphical user interface of the terminal device or the one or more client devices of the system.

Figure 5:
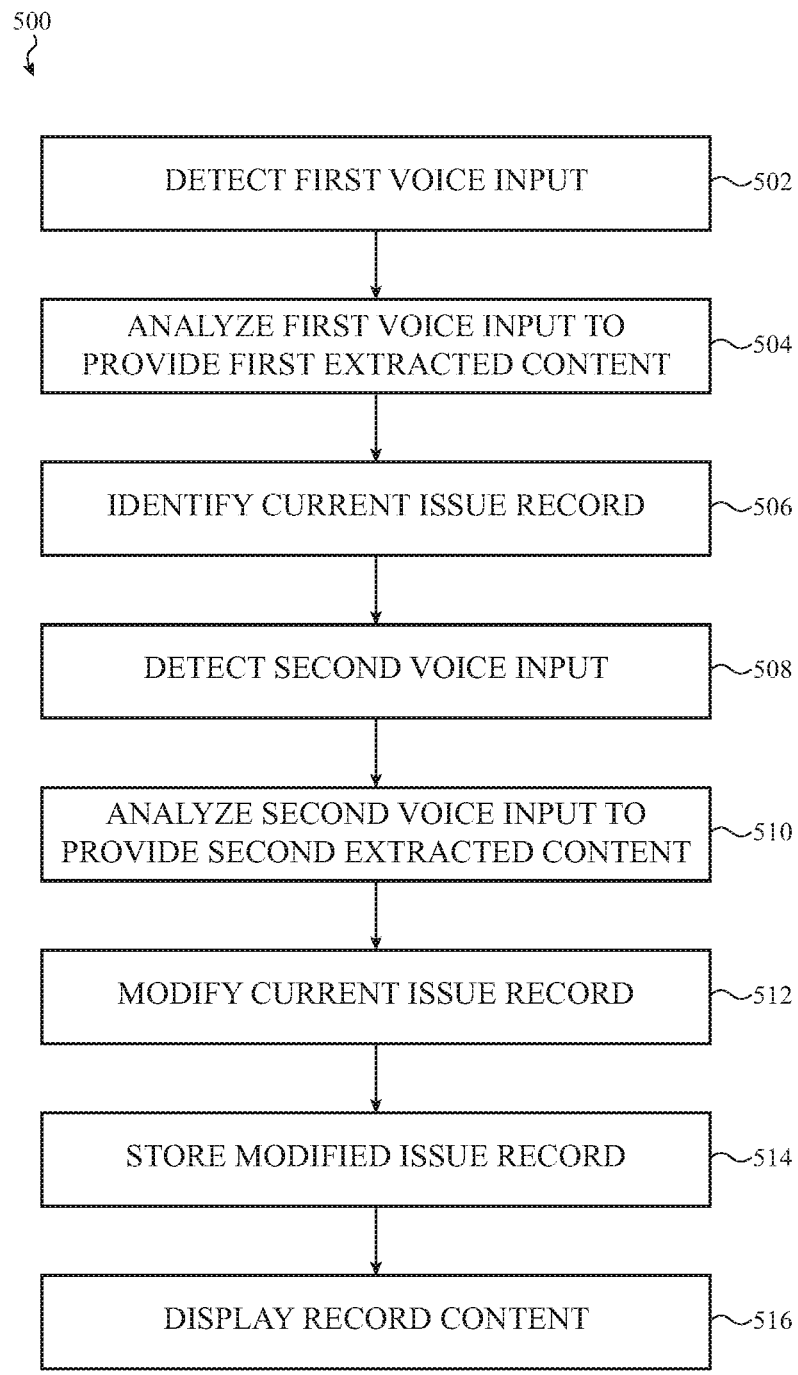
FIG. 5 is another example process for operating a voice interface system.

FIG. 5 depicts another example process 500 for modifying an issue record tracked by an issue tracking system using a voice interface system. The process 500 may be implemented using one or more of the issue tracking systems and voice interface systems described herein. In accordance with some embodiments, one or more operations of the process 500 may be omitted. Likewise, the process 500 may not be inclusive of all operations or steps, depending on the implementation.

In operation 502, a first voice input is detected. As described previously, the voice interface system may be configured to detect and analyze voice input. In some cases, the first voice input is used to identify the user or participant speaking. For example, the voice input may be analyzed to detect a name of the speaker or speaking characteristic that may be associated with the speaker. In some instances, the analyzer includes a predictive modeling element that has been trained to recognize a known set of participants through repeated use and reinforcement. In operation 504, the voice input is analyzed to provide first extracted content and, in operation 506, a current issue record of the set of issue records is identified based on the first extracted content. These operations are similar to other examples described herein and a redundant description of these operations is omitted for clarity.

In operation 508, a second voice input from the first participant is identified and in operation 510 the second voice input is analyzed to produce second extracted content. As described previously, the voice interface system may be configured to detect and analyze voice input. In operation 512, the current issue record is modified based on the extracted content to produce a modified issue record. As explained previously, the identified issue record may be edited, content of the issue record may be added, a status of the issue record may be changed, the issue record may be completed or deleted, or other modification to the issue record may be performed. In some cases, one or more additional issue records are created as a result of operation 512. For example, if the voice input includes content related to an additional issue or problem, the system may initiate the creation of a new issue record to address the additional issue or problem. In operation 514, the modified issue record may be stored in the issue tracking system. For example, the voice interface system and/or the terminal device may cause the issue record to be stored in a respective database or record storage that is associated with one or more issue tracking servers of a host service. In operation 516, content associated with the modified issue record is displayed on the display. As discussed previously, modifications to the content, status, or other aspects of the issue record may be displayed by one or more graphical objects of a graphical user interface. The one or more graphical objects (e.g., a box, window, or framed content) may represent the issue record within the graphical user interface and aspects of the graphical object (e.g., text, placement, color) may be modified in accordance with the modification performed in operation 512.

Figure 6:
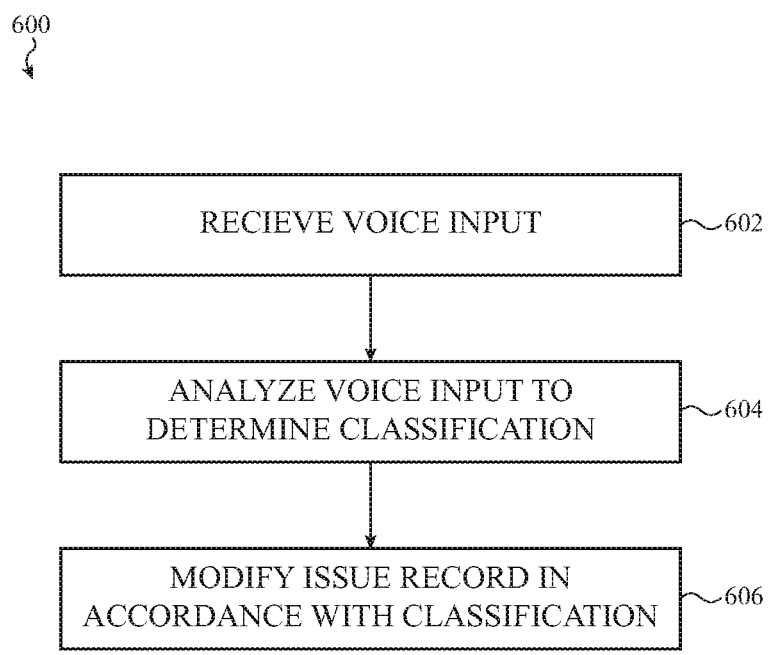
FIG. 6 is another example process for operating a voice interface system.

FIG. 6 depicts another example process 600 for modifying an issue record tracked by an issue tracking system using a voice interface system. The process 600 may be implemented using one or more of the issue tracking systems and voice interface systems described herein. In accordance with some embodiments, one or more operations of the process 600 may be omitted. Likewise, the process 600 may not be inclusive of all operations or steps, depending on the implementation.

In operation 602, a voice input is received from a participant of a group of participants attending the live meeting. As discussed previously, the voice interface system may be configured to detect and analyze voice input using an audio input device and voice analyzer. In operation 604, the voice input is analyzed to classify a user activity with respect to a respective issue record of the set of issue records. In some embodiments, the voice interface system may include an analyzer that is configured to receive a dataset or text from a voice analyzer or other voice-to-speech converter, which has been extracted from the voice input. The analyzer may be adapted to analyze extracted content and, either alone or in combination with the flow interactor, determine or classify the input as belonging to one of multiple input types. For example, the voice interface system may classify the voice input as being related to past activity, current activity, planned activity, or as being related to an issue or problem. The voice interface system may use a predictive model that is adapted to recognize elements of the voice input, such as the verb tense, time elements, and sentence structure, to classify the voice input. The model may be implemented using a Bayesian network or other machine learning tool and may be improved or modified over time with repeated use and training. While in some implementations the content of the voice input is analyzed to classify or infer a type of input that is provided, in other implementations the prompt may be designed to elicit a particular type of response. Thus, the voice interface system may classify a voice input in accordance with the type of prompt that is being responded to.

In operation 606, the issue record is modified in accordance with the classification. The type of action or modification that is performed may depend on the classification or type of response determined in operation 604. That is, the type of action that is performed may depend, at least in part, on the type of input that is provided. The flow interactor may, for example, be configured to directed different types of actions depending on the type of input.

In one example, in response to the user activity being classified as related to past activity, a status of the respective issue record may be modified in accordance with the voice input. In one example, a voice input of "the task XYZ was finished last Friday with the help of Bob and Jane," may be classified as relating to past activity due to the verb tense and time reference elements that may be extracted. In response to the classification, the corresponding issue record may be modified from "in progress" to "complete" in accordance with content extracted from the voice input.

By way of another example, in response to the user activity being classified as related to planned activity, the respective issue record may be modified to include content that corresponds to a planned activity extracted from the voice input. For example, a voice input of "we will wrap up the regression testing on the revised code modules before working on the next design" may be classified as relating to planned or near future activity due to verb tense and sentence structure of the voice input. In response to the classification, the corresponding issue record may be modified to include a narrative about the planned activity. In some instances, the extracted content may also be used to create an interdependency between the current issue record and another issue record that cannot be addressed until the current issue record is complete.

In another example, in response to the user activity being classified as related to a problem or issue, the respective issue record may be modified to include content that corresponds to a problem or issue content extracted from the voice input. For example, user input of "the design cannot be validated until we receive the final product specifications, which are currently being revised" may be classified as being related to a problem or issue due to keywords "cannot" and "until." In response to the classification, the corresponding issue may be revised to include a narrative about the problem or issue. In some instances, an additional issue record is created or an issue record is identified as being a parent or related task to the current issue record. These are provided by way of examples and there are other modifications or actions that may be performed in accordance with the classification of the input.

Similar to the other examples provided herein, the results or modifications that are performed with respect to the current issue record may be displayed on one or more devices. As described previously, a graphical user interface displayed on a terminal or client device may be modified to reflect some or all of the modifications that are implemented using the voice interface system.

Figure 7:
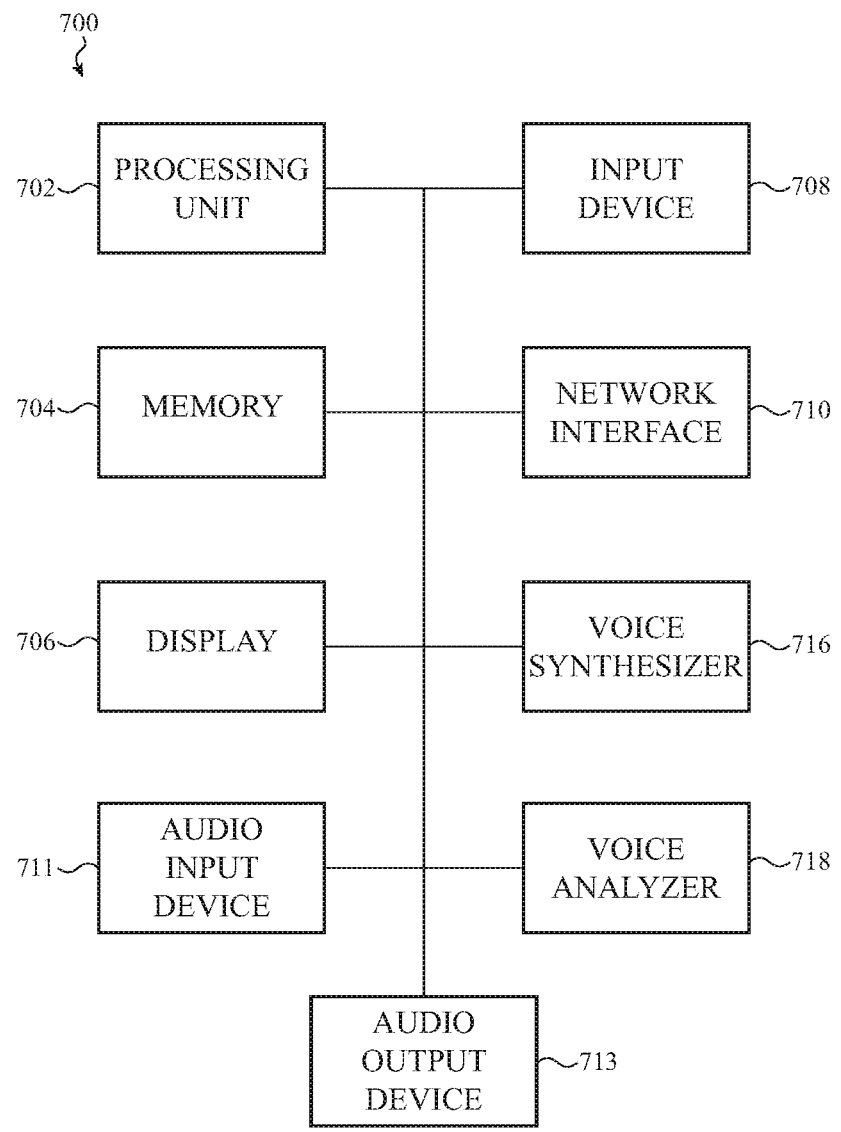
FIG. 7 depicts an example hardware configuration of a voice interface system.

FIG. 7 depicts an example schematic diagram of a device 700. By way of example, the device 700 of FIG. 7 may correspond to the voice interface system or terminal device or client device described above with respect to FIGS. 1-3 (or any other voice interface systems described herein). Aspects of the device 700 may also correspond to elements of the host service, issue tracking server, and other elements of the issue tracking system described herein. To the extent that multiple functionalities, operations, and structures are disclosed as being part of, incorporated into, or performed by the device 700, it should be understood that various embodiments may omit any or all such described functionalities, operations, and structures. Thus, different embodiments of the device 700 may have some, none, or all of the various capabilities, apparatuses, physical features, modes, and operating parameters discussed herein.

As shown in FIG. 7, a device 700 includes a processing unit 702 operatively connected to computer memory 704. The processing unit 702 may be operatively connected to the memory 704 components via an electronic bus or bridge. The processing unit 702 may include one or more computer processors or microcontrollers that are configured to perform operations in response to computer-readable instructions. The processing unit 702 may include the central processing unit (CPU) of the device. Additionally or alternatively, the processing unit 702 may include other processors within the device including application specific integrated chips (ASIC) and other microcontroller devices.

The memory 704 may include a variety of types of non-transitory computer-readable storage media, including, for example, read access memory (RAM), read-only memory (ROM), erasable programmable memory (e.g., EPROM and EEPROM), or flash memory. The memory 704 is configured to store computer-readable instructions, sensor values, and other persistent software elements. The memory 704 may also include a variety of types of non-transitory computer-readable storage media including, for example, a hard-drive storage device, a solid-state storage device, a portable magnetic storage device, or other similar device. The memory 704 may also be configured to store computer-readable instructions, sensor values, and other persistent software elements.

In this example, the processing unit 702 is operable to read computer-readable instructions stored on the memory 704. The computer-readable instructions may be provided as a computer-program product, software application, client application, issue tracking client application, and so on.

As shown in FIG. 7, the device 700 also includes a display 706. The display 706 may include a liquid-crystal display (LCD), an organic light emitting diode (OLED) display, a light emitting diode (LED) display, or the like. If the display 706 is an LCD, the display 706 may also include a backlight component that can be controlled to provide variable levels of display brightness. If the display 706 is an OLED or LED type display, the brightness of the display 706 may be controlled by modifying the electrical signals that are provided to display elements. The display 706 may correspond to any of the displays shown or described herein, such as the display 102 (FIG. 1) that is used to display a graphical user interface in accordance with the embodiments described herein.

In some embodiments, the device 700 includes one or more input devices 708. An input device 708 is a device that is configured to receive user input. The one or more input devices 708 may include, for example, a rotatable input system, a push button, a touch-activated button, a keyboard, a key pad, or the like (including any combination of these or other components). In some embodiments, the input device 708 may provide a dedicated or primary function, including, for example, a power button, volume buttons, home buttons, scroll wheels, and camera buttons.

The device 700 may also include a network interface 710 that is configured to transmit and/or receive signals or electrical communication from an external or separate device. The network interface 710 may be configured to couple to an external device via a cable, adaptor, or other type of electrical connector. In some embodiments, the network interface 710 may be used to couple the device 700 to an accessory, including a dock or case, a stylus or other input device, smart cover, smart stand, keyboard, or other device configured to send and/or receive electrical signals.

The device 700 may also include an audio input device 711 and an audio output device 713. The audio input device 711 may include a microphone or other audio or acoustic sensor that is configured to detect an audio or voice input, in accordance with embodiments described herein. The audio input device 711 may also include signal processing circuitry including, for example, an analog to digital converter, one or more signal filtering circuits, and the like. The audio output device 713 may include a speaker or other device configured to produce an audio output. In accordance with the embodiments described herein, the audio output device 713 may be configured to produce an audio output that is recognizable as speech or voice output. The audio output device may include associated drive circuitry including, for example, digital to analog converters, signal amplifiers, cross-over circuits, filters, and the like.

The device 700 may also include a voice synthesizer 716. As described herein, the voice synthesizer 716 may include hardware and software elements or components that are configured to produce an audio signal corresponding to a speech or voice output in response to a dataset or text string. In some implementations, the voice synthesizer 716 includes one or more text-to-speech (TTS) components that are configured to convert a text string into an audio signal that is recognizable by a user as speech. The voice synthesizer 716 may include one or more modules or software developer kits that implement one or more of the TTS protocols or elements, as described herein.

The device 700 may also include a voice analyzer 718. As described herein, the voice analyzer 718 may include hardware and software elements or components that are configured to produce a dataset or text string in response to an audio signal or voice input. In some embodiments, the voice analyzer 718 implements a Hidden Markov Model (HMM) that divides the audio stream or signal into fragments for which one or more coefficients or vectors is computed. The series of coefficients or vectors may be matched to one or more phonemes or units of speech, which may be used to determine corresponding text. The voice analyzer 718 may include one or more modules or software developer kits that implement one or more of the voice-to-text protocols or elements. The voice analyzer 718 may perform the voice-to-text processing using a synchronous, asynchronous, streaming, or other architecture for processing audio or voice input.

While the device 700 is described as having a particular set of components, the device 700 is not limited to only those components described herein. For example, a device may include more than one of the components described with respect to FIG. 7 or elsewhere in the instant application, and may indeed include other components not described herein.

It is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Accordingly, one may appreciate that, although many embodiments are disclosed above, the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

We claim:

1. A method of updating an issue tracking system during a live meeting facilitated by a voice interface system, the method comprising:
   receiving, by the voice interface system, a first voice input;
   parsing the first voice input into a first text;
   generating a set of keywords from the first text;
   identifying an issue tracked by the issue tracking system based on the set of keywords, the issue having a predetermined workflow defining a set of multiple issue states managed by the issue tracking system, the issue having a current state in accordance with the predetermined workflow;
   causing display of information identifying the issue for at least one participant of the live meeting;
   generating a prompt using data extracted from the identified issue;
   subsequent to providing the prompt to participants of the live meeting, receiving, by the voice interface system, a second voice input;
   analyzing the second voice input to determine if the second voice input is directed to an issue content modification or an issue state change;
   in response to the second voice input being directed to an issue content modification, cause a change to issue content of the identified issue on the issue tracking system; and in response to the second voice input being directed to an issue state change, cause the current state of the identified issue to be changed in accordance with the predetermined workflow on the issue tracking system.

2. The method of claim 1, wherein the at least one participant attends the live meeting via videoconference.

3. The method of claim 2, wherein the first voice input is received from the at least one participant.

4. The method of claim 2, further comprising:
displaying information identifying the change in the current state of the issue for the at least one participant of the live meeting.

5. The method of claim 2, further comprising:
generating a prompt to the at least one participant of the live meeting to provide the first voice input.

6. The method of claim 5, wherein the prompt is an audio prompt.

7. The method of claim 6, wherein the audio prompt comprises a synthesized voice output.

8. A voice interface system for facilitating a live meeting with multiple participants, the voice interface system comprising:
an audio output device;
an audio input device;
a memory; and
a processor configured to access the memory to instantiate an instance of software configured to communicably couple to an issue tracking system, the instance of software configured to:
provide, with the audio output device, a first synthesized voice prompt;
detect, with the audio input device, a first voice input;
parse the first voice input into a first text;
identify an item tracked by the issue tracking system based on the first text, the item having a predetermined workflow defining a set of multiple item states managed by the issue tracking system, the item having a current state in accordance with the predetermined workflow;
associate the identified item with the live meeting;
generate a second synthesized voice prompt using data extracted from the identified item;
provide, with the audio output device, the second synthesized voice prompt to participants of the live meeting;
detect, with the audio input device, a second voice input;
analyze the second voice input to determine if the second voice input is directed to an item content modification or an item state change;
in response to the second voice input being directed to an item content modification, cause a change to item content of the identified item on the issue tracking system; and
in response to the second voice input being directed to an item state change, cause the current state of the identified item to be changed in accordance with the predetermined workflow on the issue tracking system.

9. The voice interface system of claim 8, wherein the live meeting is a virtual live meeting facilitated by videoconference.

10. The voice interface system of claim 8, wherein the instance of software is configured to display in a graphical user interface an indication that the current state of the identified item has been changed.

11. The voice interface system of claim 8, wherein the item is an issue request tracked by the issue tracking system.

12. The voice interface system of claim 8, wherein the item is a project tracked by the issue tracking system.

13. The voice interface system of claim 8, wherein the first voice input is received from a first participant of the multiple participants and the second voice input is received from a second participant of the multiple participants.

14. The voice interface system of claim 8, wherein the instance of software is further configured to modify the current state of the identified item by closing an issue tracked by the issue tracking system.

15. A conference system for facilitating a virtual meeting with multiple participants, the conference system comprising:
a computing device comprising:
a memory; and
a processor configured to access the memory to instantiate an instance of software configured to communicably couple to an issue tracking system, the instance of software configured to:
provide to the virtual meeting a first synthesized voice prompt;
detect a first voice input provided by a first participant of the virtual meeting;
parse the first voice input into a first text to identify an issue record stored by the issue tracking system based on the first text, the issue record including a set of multiple issue states managed by the issue tracking system and defining a predetermined workflow of an issue associated with the issue record, the issue having a current state in accordance with the predetermined workflow;
associate the identified issue record with the virtual meeting;
generate a second synthesized voice prompt using data extracted from the identified issue record;
provide to the virtual meeting the second synthesized voice prompt;
detect a second voice input provided by a second participant of the virtual meeting;
analyze the second voice input to determine if the second voice input is directed to an issue record modification or an issue state change;
in response to the second voice input being directed to an issue record modification, cause a change to the identified issue record on the issue tracking system; and
in response to the second voice input being directed to an issue state change, cause the current state of the issue associated with the identified issue record to be changed in accordance with the predetermined workflow on the issue tracking system.

16. The conference system of claim 15, wherein the current state is a workflow status of the identified issue record.

17. The conference system of claim 15, wherein the instance of software is configured to display, for the virtual meeting, information identifying the issue record.

18. The conference system of claim 15, wherein the instance of software is configured to display, for the virtual meeting, information identifying the changed current state of the issue record.

19. The conference system of claim 15, wherein the virtual meeting is a videoconference meeting.

20. The conference system of claim 15, wherein the first synthesized voice prompt is provided to at least one participant of the multiple participants.

* * * * *